(12) United States Patent
Althaus et al.

(10) Patent No.: US 7,661,268 B2
(45) Date of Patent: Feb. 16, 2010

(54) POWER PLANT

(75) Inventors: Rolf Althaus, Herrliberg (CH); Martin Koller, Baden (CH)

(73) Assignee: Alstom Technology Ltd, Baden (CH)

( * ) Notice: Subject to any disclaimer, the term of this patent is extended or adjusted under 35 U.S.C. 154(b) by 313 days.

(21) Appl. No.: 11/812,899

(22) Filed: Jun. 22, 2007

(65) Prior Publication Data

US 2008/0148734 A1    Jun. 26, 2008

Related U.S. Application Data

(63) Continuation of application No. PCT/EP2005/057031, filed on Dec. 21, 2005.

(30) Foreign Application Priority Data

Dec. 23, 2004  (CH) .................... 2135/04

(51) Int. Cl.
*F02G 1/00* (2006.01)
(52) U.S. Cl. .................... 60/727; 60/39.182; 60/39.511
(58) Field of Classification Search .............. 60/39.182, 60/39.511, 727, 783
See application file for complete search history.

(56) References Cited

U.S. PATENT DOCUMENTS

| | | | |
|---|---|---|---|
| 3,757,517 A | 9/1973 | Rigollot | |
| 5,417,053 A * | 5/1995 | Uji | ................. 60/784 |
| 5,537,822 A | 7/1996 | Shnaid et al. | |
| 5,687,570 A * | 11/1997 | Bronicki et al. | ................. 60/655 |
| 5,704,209 A | 1/1998 | Bronicki et al. | |
| 6,167,706 B1 * | 1/2001 | Bronicki et al. | ................. 60/651 |
| 6,497,090 B2 * | 12/2002 | Bronicki et al. | ................. 60/39.6 |
| 6,526,754 B1 * | 3/2003 | Bronicki | ................. 60/671 |
| 7,100,356 B2 * | 9/2006 | Han et al. | ................. 60/39.182 |
| 2008/0000233 A1 * | 1/2008 | Althaus et al. | ................. 60/659 |
| 2008/0272597 A1 * | 11/2008 | Althaus | ................. 290/52 |

FOREIGN PATENT DOCUMENTS

GB  682 141  11/1952
WO  95/24822 A  9/1995

OTHER PUBLICATIONS

Form PCT/ISA/210 (International Search Report) dated Jun. 30, 2006.
Form PCT/ISA/237 (Written Opinion of the International Searching Authority).
From PTC/IPEA/409 (International Preliminary Report on Patentability) dated Apr. 16, 2007.

* cited by examiner

*Primary Examiner*—Michael Cuff
*Assistant Examiner*—Vikansha S Dwivedi
(74) *Attorney, Agent, or Firm*—Buchanan Ingersoll & Rooney PC

(57) ABSTRACT

During operation of a power plant, which basically comprises a gas turbogroup, a compressed air accumulator, an air turbine which is equipped with at least one generator, the compressed air which is extracted from the compressed air accumulator is directed through a heat exchanger which operates on the downstream side of the gas turbogroup, and is thermally conditioned there. This thermally conditioned compressed air then charges the air turbine for producing a quantity of electricity.

Furthermore, the power plant is extended by a steam turbine, which in combined operation is operated with steam which is produced from the exhaust gases of the gas turbogroup.

10 Claims, 1 Drawing Sheet under the condition that the two circuits, which when considered individually in themselves are part of the prior art, are brought together in a most synergetically and operationally technically very advantageous manner. Such a power plant, specifically the gas turbogroup to be combined with a steam circuit and with a pressure accumulator system, first of all enables a maximum operational flexibility, wherein heat exchangers are implemented at a suitable point. By means of such a circuit, the pressure accumulator system also gains potential, therefore in the case of low electricity prices, for example, recuperative measures can be applied at any time with profitable effect.

POWER PLANT

TECHNICAL FIELD

The present invention relates to a power plant according to the preamble of claim 1.

BACKGROUND OF THE INVENTION

Gas turbine power plants have become known from the prior art, in which the exhaust gas heat of a gas turbogroup is used for steam generation, wherein the steam can be supplied for diverse application purposes. In combined cycle power plants, the steam is then expanded in a steam turbine according to requirements, delivering power. The steam turbine drives a generator for generation of electricity.

Furthermore, a recuperative pressure accumulator system has become known, for example, from U.S. Pat. No. 5,537,822, in which fluid, especially air, which is accumulated under pressure in a storage volume, is heated in a heat exchanger by the exhaust gas of a gas turbogroup and subsequently expanded in an accumulator fluid expansion machine for driving a generator, delivering power. In this case, very high outputs can be achieved in principle, since during power operation the compression of the fluid is dispensed with. Consequently, higher output potentials result when utilizing the exhaust gas heat in a recuperative pressure accumulator system than when utilizing it in a steam turbine. These potentials, however, are available only so long as expanded fluid is available at a corresponding pressure level in the stored volume.

Such a power plant, therefore, does not solve the problem that the potential, which is indisputable in itself, is available only so long as compressed fluid is available at a corresponding pressure level in the storage volume.

SUMMARY OF THE INVENTION

The invention will provide a remedy in this case. The invention, as it is characterized in the claims, is based on the object of proposing in a circuit of the type mentioned in the introduction measures which are able to eradicate the aforementioned disadvantages. In this case, it is especially about proposing the provision of a synergetically and operationally technically very advantageous circuit which at any time is in the position of directly enabling a maximized or maximum operational flexibility, as the case may be, by means of autonomous means inside the power plant.

The power plant which is described for the prior art can be flexibly designed by means of an extension by the gas turbogroup being optionally combined with a steam circuit in such a way that the two circuits, which when considered individually in themselves are part of the prior art, are brought together in a most synergetically and operationally technically very advantageous manner. Such a power plant, specifically the gas turbogroup to be combined with a steam circuit and with a pressure accumulator system, first of all enables a maximum operational flexibility, wherein heat exchangers are implemented at a suitable point. By means of such a circuit, the pressure accumulator system also gains potential, therefore in the case of low electricity prices, for example, recuperative measures can be applied at any time with profitable effect.

In this case, the power plant which is described here enables the following modes of operation. In normal continuous operation, a generator is coupled to the gas turbogroup. A second generator is coupled to the steam turbine. A flow divider, which is arranged downstream of the gas turbine, is adjusted so that the exhaust gas of the gas turbogroup is directed to the steam turbine. The power plant then operates in conventional combined operation for permanent generation of electricity. With falling demand for electrical power and correspondingly low electricity prices, the connection to the compressors, which are arranged on the shaft trains of the gas turbogroup and of the steam turbine, is additionally made. It is now possible to divide the output of the gas turbogroup and/or of the steam turbine between the respective generators and compressors. Furthermore, it is possible to electromotively operate the generators in no-load mode or even to support the drive of the compressors. In addition, the generator of the air turbine can also be coupled to a compressor and electromotively operated. In this way, especially with low electricity prices, the compressed air accumulator can be very quickly and profitably replenished.

Consequently, that makes it possible that this air in the compressed air accumulator, in times of high demand for power, can be calorifically conditioned in a gas/air heat exchanger during the exchange of heat with the exhaust gas of the gas turbogroup, and afterwards can be expanded in the air turbine, delivering power.

And if the gas/air heat exchanger, in the case of a direct demand, should have too little heat accumulation from the previous operation, this can easily be gathered, for example, by a tubular burner being provided, which in such situations can directly engage and so can quickly produce the heat capacity which is missing.

All the same, it can be established that the compressed air accumulator during the recuperative operating mode has an inherent heat potential, so that the air which is extracted from the compressed air accumulator and which is customarily available with a pressure of at least 60 bar at a temperature of about 30° C., is readily heated up to about 550° C. after flowing through the gas/air heat exchanger. The pressure of this thermally conditioned air, meanwhile, still remains high, customarily in the order of magnitude of about 55 bar.

Therefore, a high-value working air is available, which is especially well suited to directly operating the air turbine which is part of the power plant and to producing electricity there by means of the generator which is coupled to the air turbine.

Advantageous and expedient developments of the object solution according to the invention are characterized in the further dependent claims.

An exemplary embodiment of the invention is explained in detail in the following, with reference to the drawing. All elements which are not necessary for the direct understanding of the invention have been omitted. Like elements in the different figures, insofar as such are introduced into the method, are provided with same designations. The flow direction of the media is indicated by arrows.

WAYS OF IMPLEMENTING THE INVENTION, INDUSTRIAL APPLICABILITY

Figure 1:
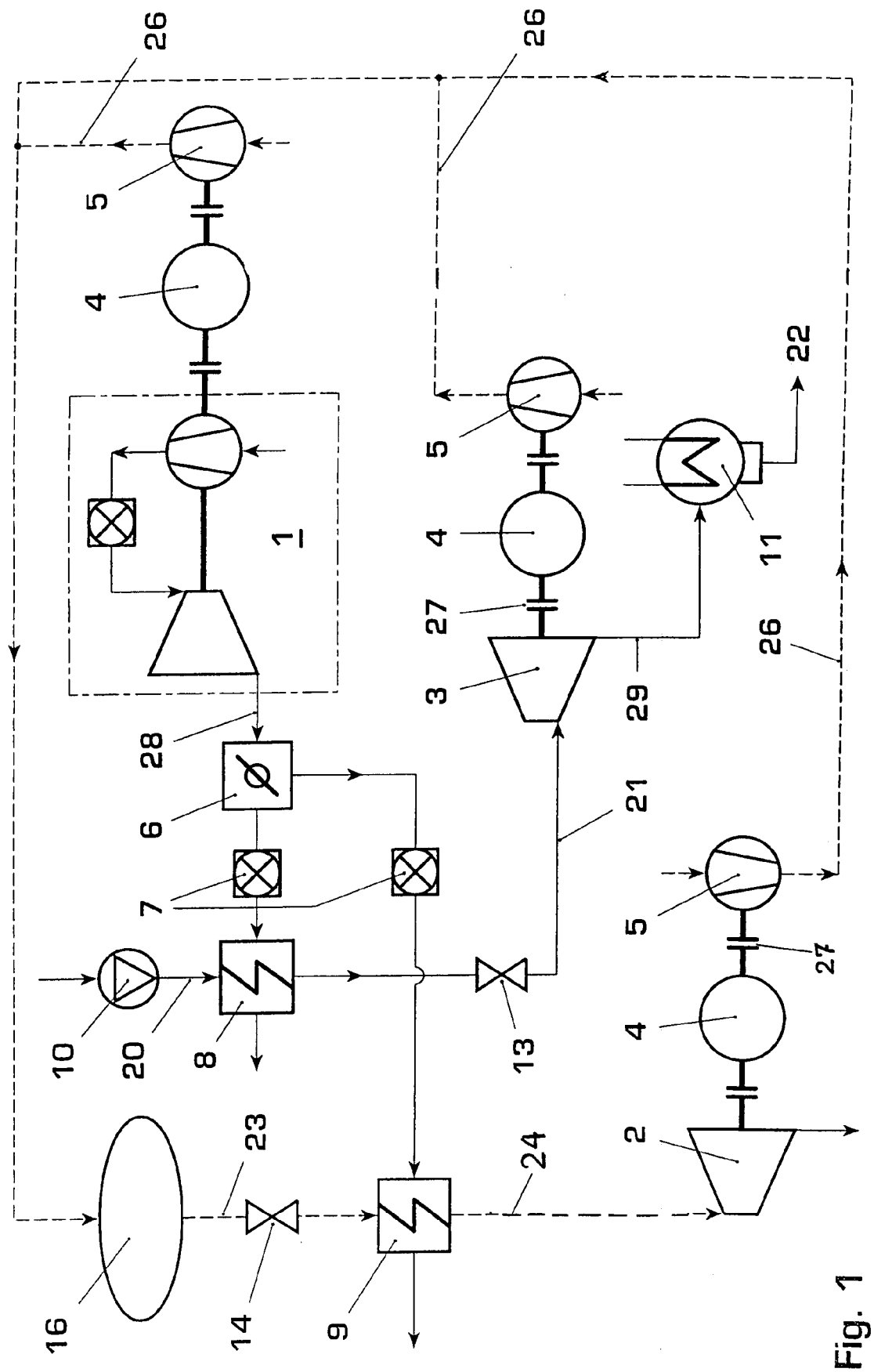
FIG. 1 shows a power plant, which is constructed for an alternative operation.

The power plant which is shown in the FIGURE comprises a gas turbogroup 1, a steam turbine 3, and also a compressed air accumulator 16 with an air turbine 2. Both the gas turbogroup 1 and the steam turbine 3 and the air turbine 2, are each arranged with a generator 4 and a compressor 5 on a common shaft train. In this case, controllable clutches 27 are provided in each case between the respective driving engine and the generator, and also between the compressor and the generator. All the generators 4 are preferably also electromotively operable. A flow divider 6 with a damper is arranged in the exhaust gas flow path of the gas turbogroup 1, which makes it possible to selectively direct the exhaust gas 28 of the gas turbogroup 1 to a steam generator 8 for feed of the steam turbine 3, or to a gas/air heat exchanger 9. An optional tubular burner 7 is also arranged in each case upstream of the steam generator 8 and upstream of the gas/air heat exchanger 9, which makes it possible to increase the thermal power which is available in the respective heat exchanger. The steam turbine 3 and the steam generator 8 are integrated in an as known per se manner in a water-steam circuit. This comprises a feed water pump 10 which feeds feed water 20 under pressure to the steam generator 8. Live steam 21, which is produced there during the exchange of heat with exhaust gases 28 of the gas turbogroup 1, is directed via a live steam valve 13 to the steam turbine 3 and expanded there, delivering power. The expanded steam 29 is expanded in a condenser 11, and the condensate 22 is fed back to the feed water pump 10. The compressed air accumulator 16 is replenishable with compressed air 26 by means of the compressor 5. In times of high demand for power, this air in the gas/air heat exchanger 9 is heated during the exchange of heat with the exhaust gas 28 of the gas turbogroup 1 and is expanded in the air turbine 2, delivering power. A tubular burner, which is not shown in detail, is optionally also provided in this case downstream of this gas/air heat exchanger 9 and, if necessary, is put into operation when the air turbine 2 is to be operated alone with the available compressed air in the compressed air accumulator 16.

Such a compressed air accumulator system is naturally available for power delivery only over limited periods of time, consequently until the pressure in the compressed air accumulator 16 drops below a critical value. The power plant which is described in this case, for example, enables the following modes of operation. In a normal continuous operation, a generator 4 is coupled to the gas turbogroup 1. A second generator 4 is coupled to the steam turbine 3. The exhaust gas damper is positioned accordingly in the flow divider 6 so that the exhaust gas 28 of the gas turbogroup 1 is directed to the steam generator 8. The power plant then operates in conventional combined operation for permanent generation of electricity. With falling demand for electrical power and correspondingly lower electricity prices, the connection to the compressors 5, which are arranged on the shaft trains of the gas turbogroup 1 and of the steam turbine 3, is additionally made. It is now possible to divide the power of the gas turbogroup 1 and/or of the steam turbine 3 between the respective generators 4 and compressors 5. Furthermore, it is possible to electromotively operate the generators 4 in no-load mode or even to support the drive of the compressors 5. In addition, the generator 4 of the air turbine 2 can also be coupled to a compressor 5 and be electromotively operated. In this way, with lower electricity prices, the compressed air accumulator 16 can be charged very quickly, by which an important energy reserve is available. In times of high demand for power and correspondingly high electricity prices, the compressors 5 are shut down. Furthermore, the steam turbine 3 is also shut down. That means, all the compressors 5, or at least the compressors, as the case may be, which are arranged on the shaft trains of the gas turbogroup 1 and of the air turbine 2, are separated from the generators 4. The air turbine 2 and the gas turbogroup 1 are connected to the respective generator 4. The exhaust gas damper in the flow divider 6 is adjusted so that the exhaust gas 28 flows through the gas/air heat exchanger 9. The shut-off component 14, which is arranged downstream of the compressed air accumulator 16, is opened, and so compressed air is directed from the compressed air accumulator 16 into the gas/air heat exchanger 9, heated there, and expanded in the air turbine 2 for generation of electricity. Naturally, the arrangement which is shown, with its diverse possibilities of fluid guiding and power division, enables a multiplicity of possible further operating variants, which the person skilled in art realizes according to requirement, and which have not been conclusively represented within this scope.

The gas/air heat exchanger itself, which is part of the operation of the power plant in the recuperative operating mode by means of the pressure accumulator system, has an inherent heat potential, so that the compressed air 23 which is extracted from the pressure accumulator, which is customarily available with a pressure of at least 60 bar at a temperature of about 30° C., is heated to about 550° C. after flowing through the gas/air heat exchanger. The pressure of this thermally conditioned compressed air, meanwhile, still remains high, customarily in the order of magnitude of about 55 bar. Therefore, sufficient potential is available for conditioning of the working air in order to safely generate a relatively large electrical energy.

If the heat exchanger, in the case of such a direct demand, should have too little heat accumulation from the previous operation, this can easily be gathered, for example, by putting into use a tubular burner, which is not shown in detail in the drawing, which in such situations directly engages and so can quickly introduce the heat capacity from the gas/air heat exchanger 9 which is missing.

LIST OF DESIGNATIONS

1 Gas turbogroup
2 Air turbine
3 Steam turbine
4 Generator(s)
5 Compressor(s)
6 Flow divider with damper, flow divider
7 Tubular burner
8 Steam generator
9 Gas/air heat exchanger
10 Feed water pump
11 Condenser
13 Live steam valve
14 Shut-off component
16 Compressed air accumulator
20 Feed water
21 Live steam
22 Condensate
23 Compressed air
24 Thermally conditioned compressed air
26 Compressed air (line)
27 Clutch
28 Exhaust gas
29 Expanded steam

The invention claimed is:

1. A power plant, comprising:
a gas turbogroup;
a steam turbine;
a compressed air accumulator
a separate air turbine; and
a flow divider, with an adjustable damper for exhaust gases of the gas turbogroup, arranged downstream of the gas turbogroup, which flow divider is equipped with at least two fluid flow paths, one of the flow paths being in communication with a steam generator and, downstream of the steam generator, being in communication with the steam turbine, and another of the two flow paths being in communication with a heat exchanger, the heat exchanger being in communication upstream with the compressed air accumulator and being in communication downstream with the air turbine.

2. The power plant as claimed in claim 1, wherein the steam turbine and/or the air turbine is equipped with at least one generator.

3. The power plant as claimed in claim 1, wherein the steam turbine and/or the air turbine is equipped with at least one compressor.

4. The power plant as claimed in claim 3, wherein the compressor is connected by means of a clutch.

5. The power plant as claimed in claim 1, wherein at least one tubular burner is arranged downstream of the flow divider in at least one of the two flow paths.

6. A method for operating a power plant having a gas turbogroup, a compressed air accumulator, a separate air turbine which is equipped with at least one generator and which is extended by a steam turbine, which in combined operation is operated with steam produced from exhaust gases of the gas turbogroup, wherein the method comprises:
   directing compressed air which is extracted from the compressed air accumulator through a heat exchanger which operates on a downstream side of the gas turbogroup, for thermally conditioning the compressed air;
   charging the air turbine with the compressed air for producing a quantity of electricity; and
   using the exhaust gases of the gas turbo group, depending upon operating mode, for conditioning of a steam volume in a steam generator, or for thermal conditioning of the compressed air in the heat exchanger or both.

7. The method as claimed in claim 6, wherein the compressed air from the compressed air accumulator, after flowing through the heat exchanger which operates downstream, is subjected to thermal conditioning by a tubular burner, before charging the air turbine.

8. The method as claimed in claim 7, wherein the compressed air from the compressed air accumulator is thermally conditioned either in the heat exchanger or by means of the tubular burner or both.

9. The method as claimed in claim 6, wherein the gas turbogroup, air turbine and steam turbine are operated each with a generator and a compressor, and wherein each compressor, individually or in combination is used for charging the compressed air accumulator with compressed air.

10. The method as claimed in claim 6, wherein the exhaust gases are thermally conditioned by additional tubular burners.

* * * * *